T. WHITWELL.
Apparatus for Heating Air and Gases.

No. 199,388. Patented Jan. 22, 1878.

Fig. 1.

WITNESSES:            INVENTOR:
                By his Attorneys   Thomas Whitwell.

T. WHITWELL.
Apparatus for Heating Air and Gases.

No. 199,388. Patented Jan. 22, 1878.

Fig. 3.

WITNESSES:

INVENTOR:
Thomas Whitwell
By his Attorneys

T. WHITWELL.
Apparatus for Heating Air and Gases.

No. 199,388. Patented Jan. 22, 1878.

Fig. 4.

WITNESSES:
Wm A Skinkle
Geo. W. Breck

INVENTOR:
Thomas Whitwell
By his Attorneys
Baldwin, Hopkins & Peyton

T. WHITWELL.
Apparatus for Heating Air and Gases.

No. 199,388. Patented Jan. 22, 1878.

Fig. 5.

WITNESSES:
Wm A Skinkle
Geo W Breck

INVENTOR.
Thomas Whitwell,
By his Attorneys
Baldwin Hopkins & Peyton

T. WHITWELL.
Apparatus for Heating Air and Gases.

No. 199,388.      Patented Jan. 22, 1878.

*Fig. 8.*

WITNESSES:
Wm A. Skinkle
Geo. W. Breck

By his Attorneys,
Baldwin, Hopkins & Peyton

INVENTOR:
Thomas Whitwell

UNITED STATES PATENT OFFICE.

THOMAS WHITWELL, OF SOUTH STOCKTON, ENGLAND.

IMPROVEMENT IN APPARATUS FOR HEATING AIR AND GASES.

Specification forming part of Letters Patent No. 199,388, dated January 22, 1878; application filed November 9, 1876; patented in England, May 16, 1876.

*To all whom it may concern:*

Be it known that I, THOMAS WHITWELL, of the Thornaby Iron-Works, South Stockton, in the county of York, England, ironmaster, have invented new and useful Improvements in Apparatus for Heating Air and Gases, which improvements are fully set forth in the following specification, reference being had to the accompanying drawings.

This invention has for its object improvements in apparatus for heating air and gases.

A patent for an invention having a similar object was granted to me in the United States of America, bearing date the 27th day of August, 1872, No. 130,885.

According to my present invention I form the furnace, oven, or chamber and the iron case which incloses it of a cylindrical, elliptical, or oval form, and make use of the cleaning-doors at the top, the bottom, the sides, or any convenient position, for the purpose of cleansing the same, as may be required.

In the before-mentioned specification I showed the gas and air passing above and below the vertical transverse partitions or walls alternately, these being properly supported with longitudinal walls to increase the strength and durability of the same.

In my present invention I pass the air or gas in the same direction up one or two or three or four walls, and in like manner I pass the air or gas over and down one or two or three or four walls placed and arranged so as to be cleaned by the cleaning-doors at the top, bottom, sides, or other convenient part of the stove, as set forth in my previous specification.

I also support my transverse walls by longitudinal walls placed where needful for the proper support of the same, the whole to be commanded by the cleaning-doors, as before set forth, for the efficient cleansing of the whole structure.

I make the top or roof of the furnace, oven, or chamber either flat or arched.

Referring to the drawings, Figures 1, 2, 3, and 4 are vertical sections of a furnace, oven, or heating-chamber, with different numbers of transverse walls and air-passages.

In each of these figures the same letters of reference are used to indicate the same parts.

The furnace, oven, or heating-chamber consists of an air-tight shell of iron, inclosing a circular, elliptical, or oval wall, constructed of fire-brick or other material suitable to the temperature it will have to bear.

The furnace, oven, or heating-chamber is divided by several transverse walls, A A, at varying distances from each other, which are crossed at right angles by longitudinal walls for the more perfect support of the same, the whole being properly bonded together.

The transverse walls A are open at top or bottom, where required, so that the air or gases to be heated, entering at the chimney end of the furnace, oven, or chamber, are, by the construction of the walls, caused to ascend and descend till the heated air or gases leave the furnace, oven, or heating-chamber at the opposite end to that at which they entered. In each of these furnaces the distance which the gas has to traverse and the number of turns it has to make is diminished by causing the currents to divide and pass in the same direction along two or more adjacent walls or partitions, in place of, as described in my former specification, passing alternately over and under the vertical transverse walls or partitions.

At the top of each furnace, oven, or heating-chamber are iron doors K K, which are protected by fire-plugs or lumps L L, which fit the openings in the top of the furnace or heating-chamber. These openings on the top of the furnace, oven, or heating-chamber are, by preference, formed over the walls, which do not come to the top of the furnace, oven, or heating-chamber, by which means the surfaces of the walls below the openings can be cleansed with facility. These openings, when the air or gases are passing through the furnace, oven, or heating-chamber, are kept closed.

The height of the walls, as well as the number of the same, may be varied to suit the extent of surface over which it is desired that the air or gases to be heated shall pass.

Two or more furnaces, ovens, or heating-chambers are used in combination, in order to maintain a regular stream of heated air or gases.

Hot or waste gas from any suitable source is supplied to one furnace, oven, or heating-chamber while the air or gases to be heated are passing through another furnace, oven, or heating-chamber, and the arrangement of the valves and passages in connection with the furnaces, ovens, or heating-chambers is such that the air or gases to be heated pass through the furnace, oven, or heating-chamber in the opposite direction, and over the identical surfaces of the brick-walls previously traversed by the burning gases on heating the furnace, oven, or heating chamber. By these means the air or gases to be heated absorb heat from the walls in ascending or descending the walls, and thus become of the same, or nearly the same, heat as the walls of the furnace, oven, or heating-chamber prior to leaving the same.

The arrows in full lines represent the path traversed by the burning gases, and those in dotted lines the course of the air or gas to be heated.

The dust carried by the burning gas employed in heating the furnace, oven, or heating-chamber accumulates on the walls, and requires to be scraped or removed from time to time. The scraping or removal from the walls is performed by proper tools introduced through the top openings K K, as above described, and the dust is removed from the bottom of each chamber or oven through the openings closed by the doors D D by means of convenient tools, or by openings in the bottom, as in my former patent.

I will now describe the process of the heating of the furnace, oven, or heating-chamber.

The highly-heated waste products of combustion or burning gas from any suitable source is made to enter through the gas-inlet valve near B, whence it is conducted to the furnace, oven, or heating-chamber by the pipe C. The hot-outlet E is closed, and also the cold-inlet F, while the chimney-valve near G is opened, as also the air-inlet valves H H, (see Fig. 8,) for assisting in the combustion of the burning gas. By this means the walls of the furnace, oven, or heating-chamber are made red-hot to a proper proportion of the whole furnace, oven, or heating-chamber, during which time the air or gases to be heated have been traversing other furnaces, ovens, or heating-chambers heated previously in a similar manner. The air admitted at H H for assisting in the combustion of the burning gas is conducted to and fro by long air-passages M N, formed in the thickness of the vertical walls in such way that the air becomes red-hot before it meets the burning gas, and hence the combustion is made more intense.

I will now describe the heating of the air or gases. The furnace, oven, or heating-chamber being made red-hot, as above described, the burning-gas inlet near B is closed, as also the air-inlets H H. The chimney-valve near G is also closed. The hot-outlet E, which is lined with refractory material, is now opened, also the cold-inlet F, by which means the air or gases to be heated are made to enter the furnace, oven, or chamber at the coldest end, and, by the construction of the furnace, oven, or heating-chamber, the air or gases to be heated ascend one or two or three or four walls, A, and then descend one or two or three or four walls, as may be, till they attain the required temperature, and issue from the furnace, oven, or heating-chamber by means of the hot-outlet E. After a proper interval of time—that is to say, before the air or gases to be heated cease to be sufficiently heated—they are shut off from the furnace, oven, or heating-chamber, and made to pass through another similar furnace, oven, or chamber previously heated, by which means a constant current of heated air or gases is maintained.

Figure 1:
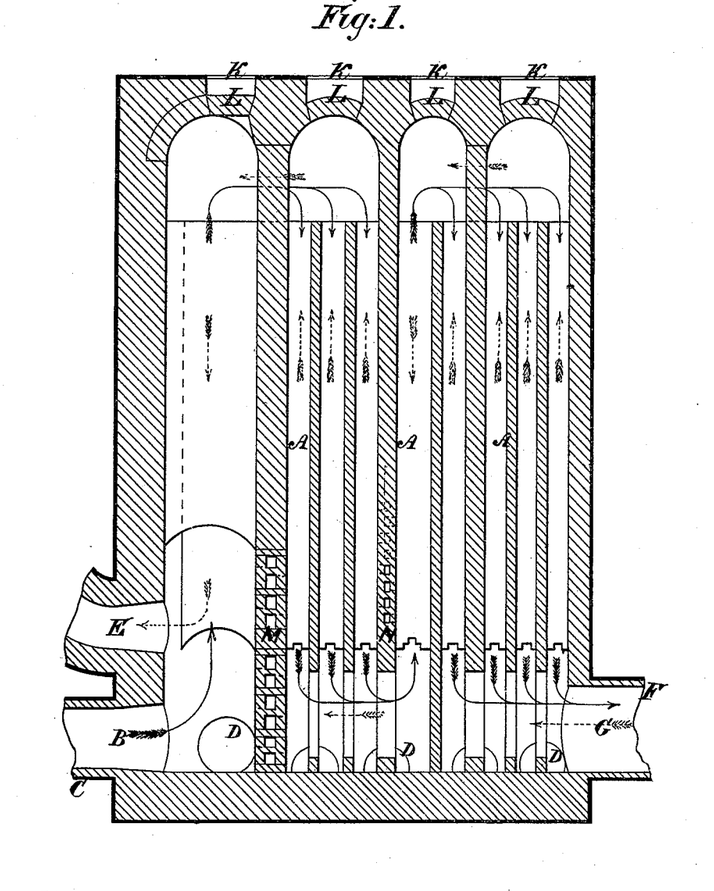
Figure 2:
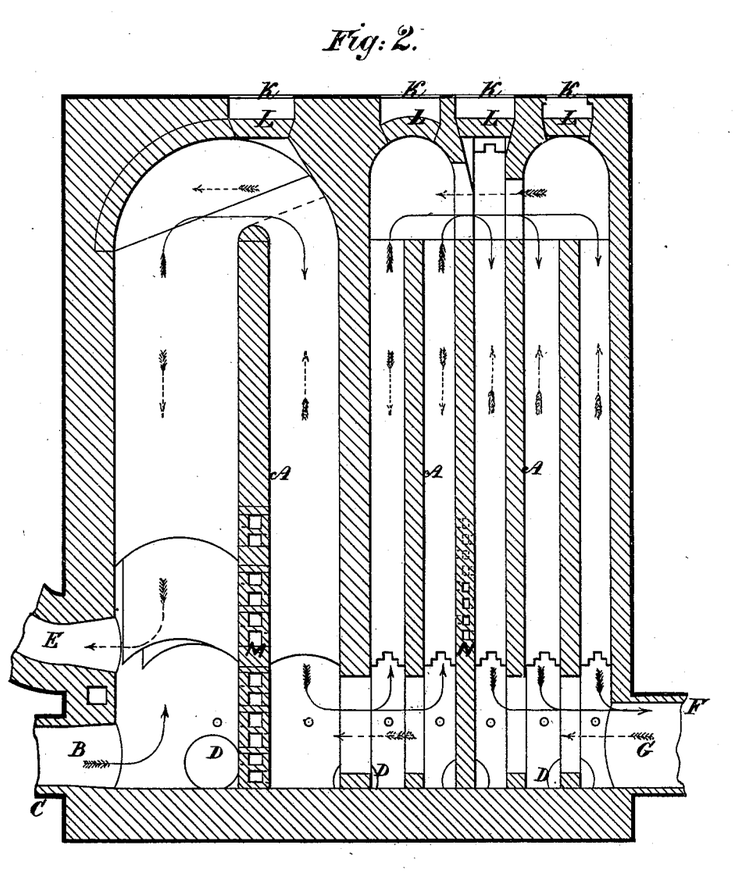

Fig. 1 shows the heating-gas entering at B, mounting to the top of the furnace, oven, or heating-chamber, then descending at once three passages in the same direction, then rising up one passage and descending four others at once. Fig. 2—the heating-gas ascends, then descends in single passages, then ascends two passages and descends three passages in the same direction. Fig. 3—the heating-gas rises up one passage, descends by two passages, ascends one, and descends two in the same direction, and thus consecutively. Fig. 4—the heating-gas passes up and down, on the former system, through half the furnace, oven, or heating-chamber, and then descends three passages in its course to the chimney.

The whole of the above forms of furnace, oven, or heating-chamber are cleansed by means of tools introduced at openings at top K, at bottom, sides, &c., as may be most convenient.

Figure 5:
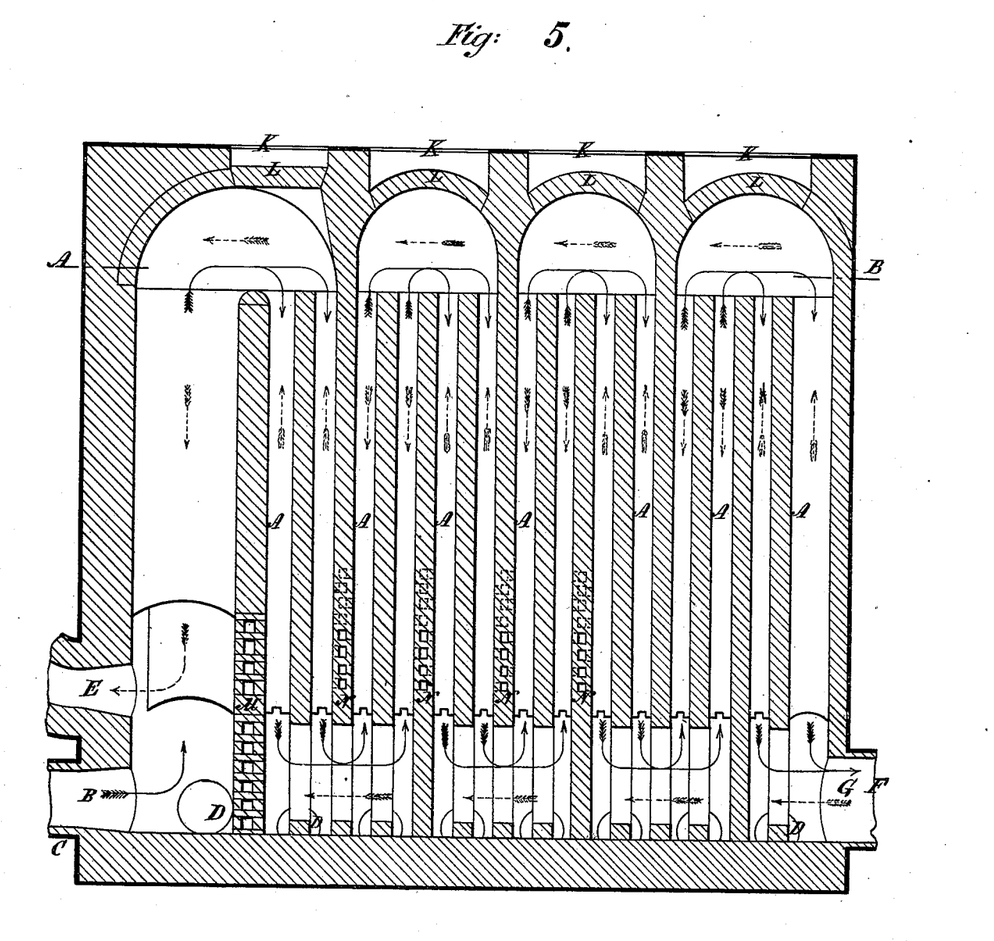
Figure 6:
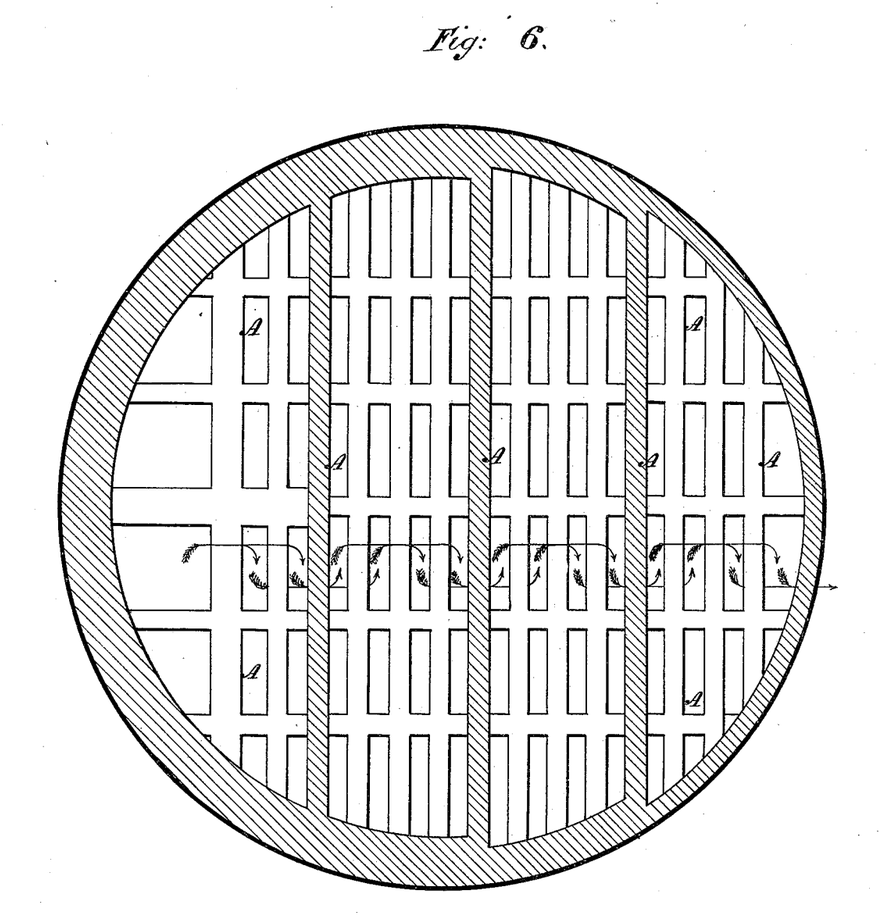

Fig. 5 is a vertical section, and Fig. 6 is a sectional plan, of a furnace, oven, or heating-chamber where the heating-gases proceed up one passage, then down two, then up two, and down two, and so on through the furnace, oven, or heating-chamber, the wall-surfaces being cleansed by tools introduced through the doors K by removing the lumps of fire-brick L, the dust being removed at the bottom of the furnace, oven, or heating-chamber, as may be most convenient.

By means of all these descriptions of furnaces, ovens, or heating-chambers, the friction on the air and gases interposed by many bends is obviated, and better results are obtained.

Figure 7:
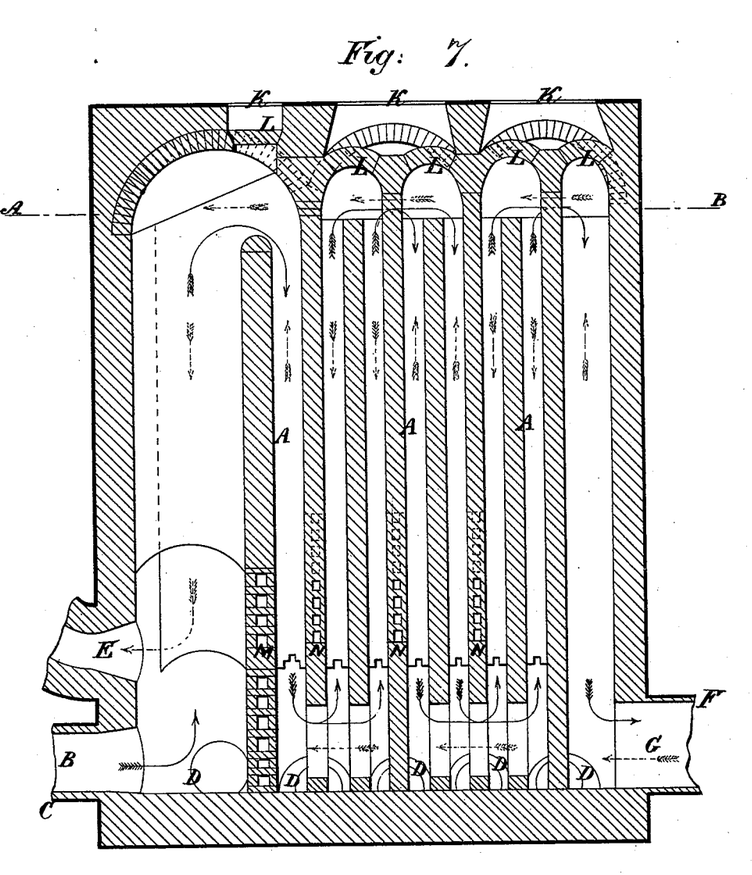
Figure 8:
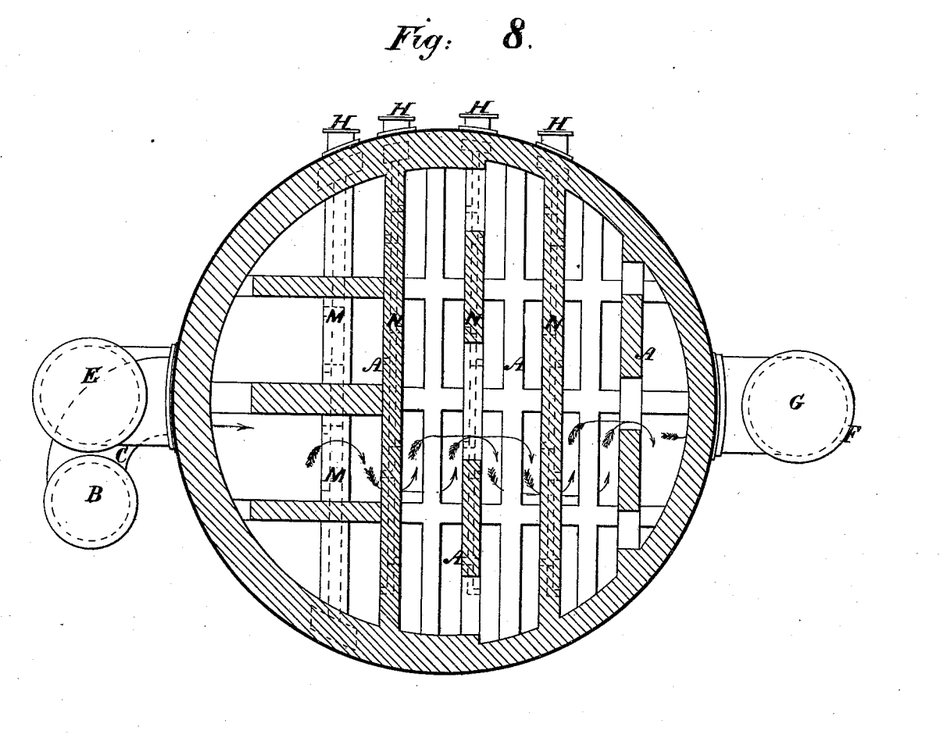

Fig. 7 is a vertical section, and Fig. 8 is a sectional plan, of a furnace, oven, or heating-chamber, either circular, elliptical, oval, or any other shape, in which the heating-gas proceeds up one passage, then down one passage, then ascends and descends two passages alternately, till it comes to the cold end of furnace, oven, or heating-chamber, where it passes down one passage and out through chimney-valve near G.

The same letters of reference are used in all the figures to indicate the same parts, and the full arrows show the direction of the flow of the burning gas, and the dotted arrows the course pursued by the air or gas to be heated.

Although the tops of all these descriptions of furnaces, ovens, or heating-chambers are shown flat, yet they may be flat or arched, as may be most convenient or suitable, provided with cleaning-doors and openings, for the purpose of giving access to every part of the passages and walls, so as to cleanse them from dust deposited by the burning gases, &c.

Having thus described the nature of my said invention, and the manner of performing the same, I would have it understood that I claim—

The heating apparatus (through which the burning gas and the air or gas to be heated pass alternately, in opposite directions, in contact with the same surfaces) constructed with transverse vertical walls or partitions, crossing from side to side, and arranged in series or sets, forming divided passage-ways, which are connected with each other alternately at top and bottom, and extend across the apparatus, whereby friction is lessened, while heating-surfaces of the width of the apparatus are provided, substantially as and for the purpose set forth.

THOMAS WHITWELL.

In presence of—
FREDERICK ROBSON,
*Solicitor, Stockton-on-Tees.*
JOHN JOLLY PEMBERTON,
*Solicitor's Clerk, Stockton-on-Tees.*